Figure 1:
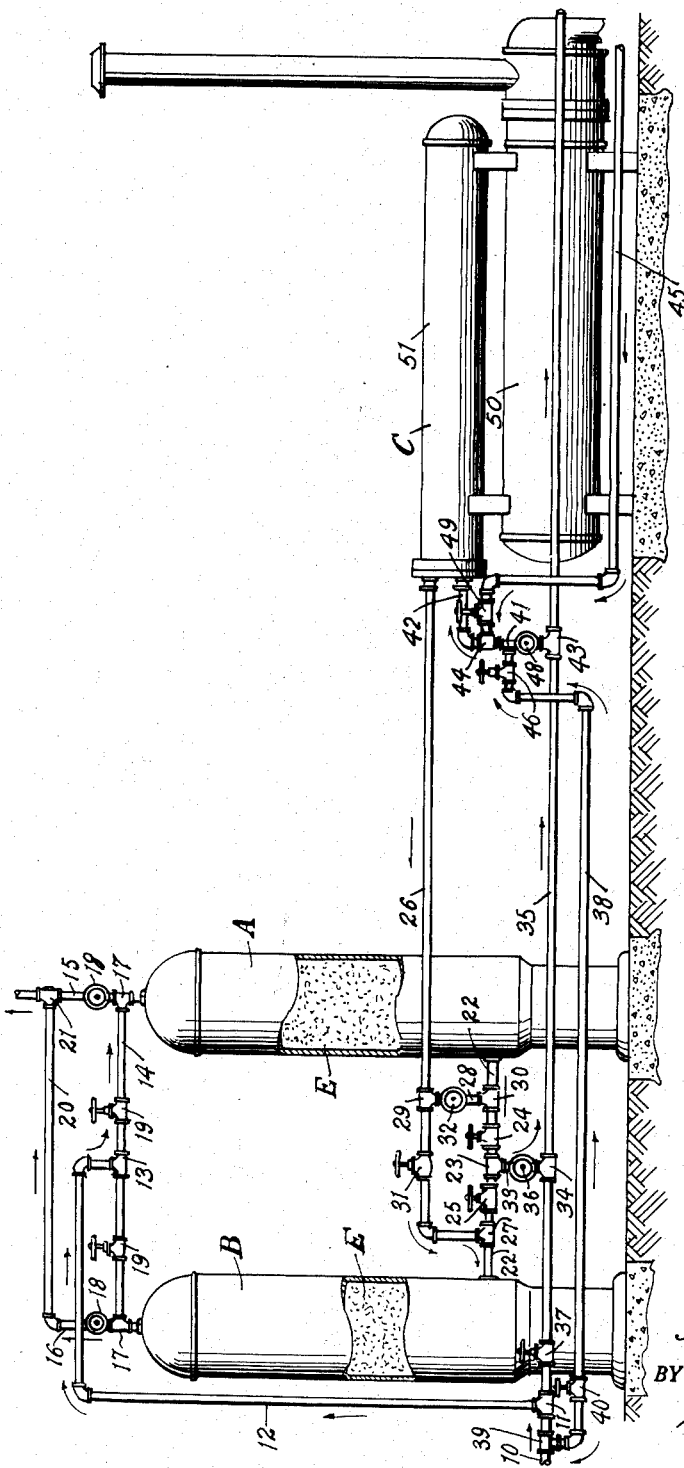

JAY P. WALKER
CLARENCE O. GLASGOW
INVENTOR.

Jay P. Walker
Clarence O. Glasgow
Inventors

By Ashley & Ashley
Attorneys

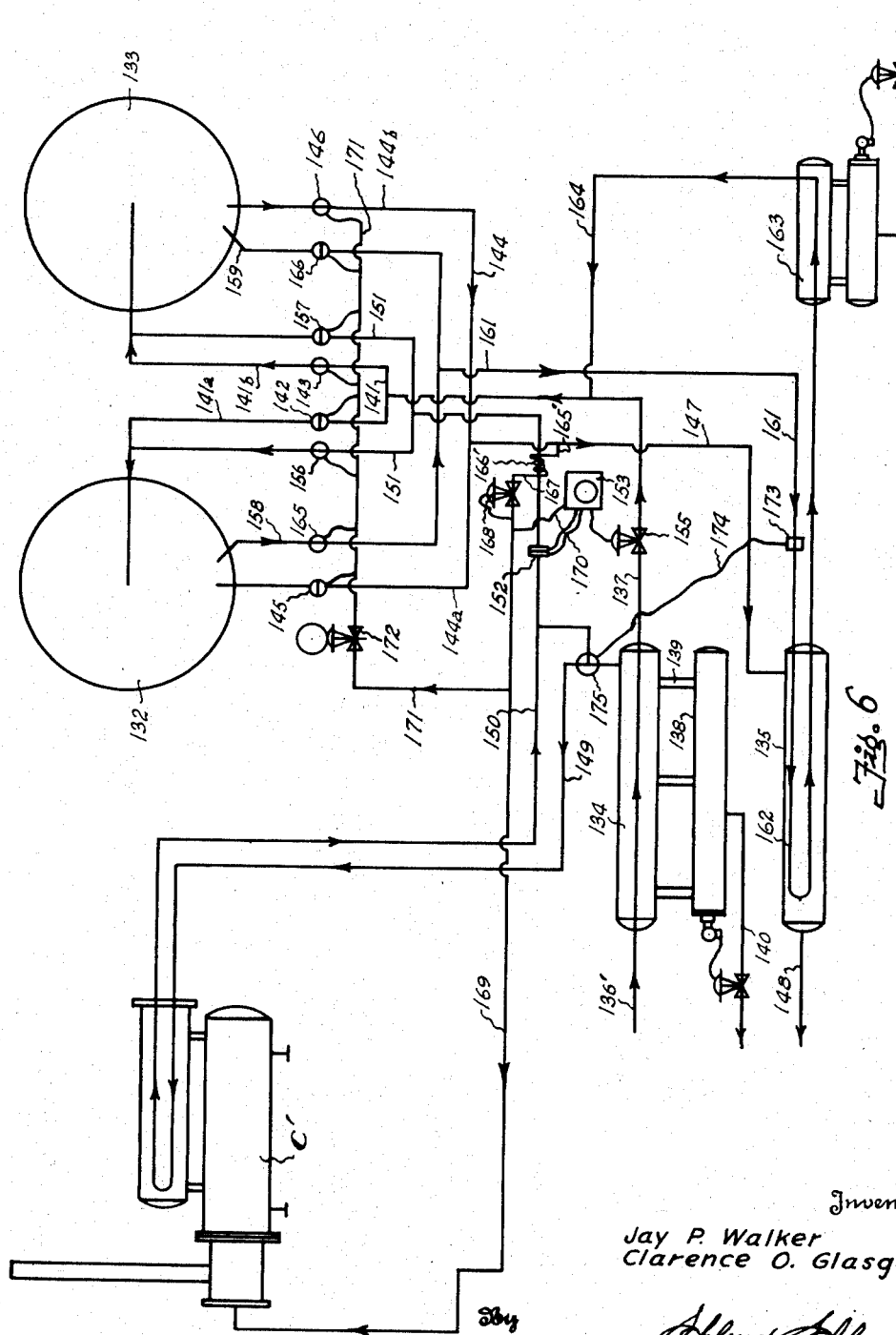

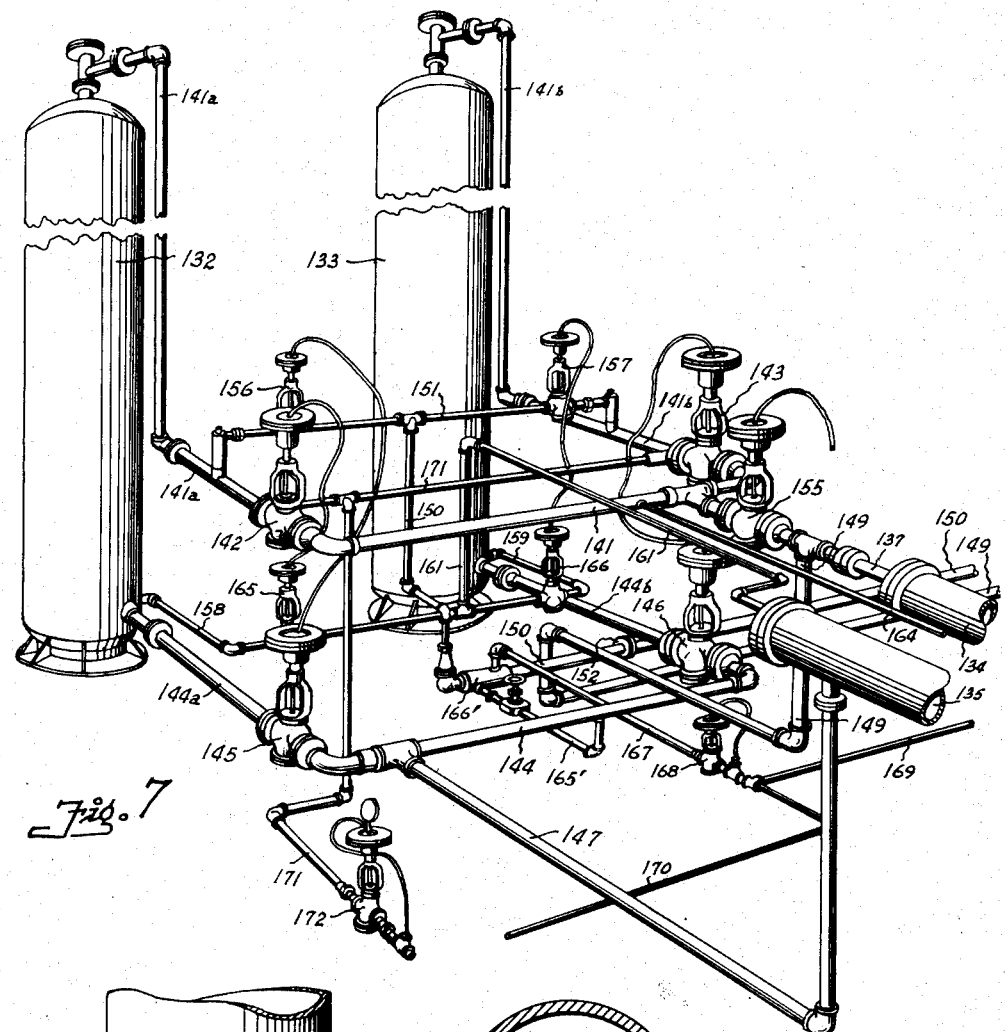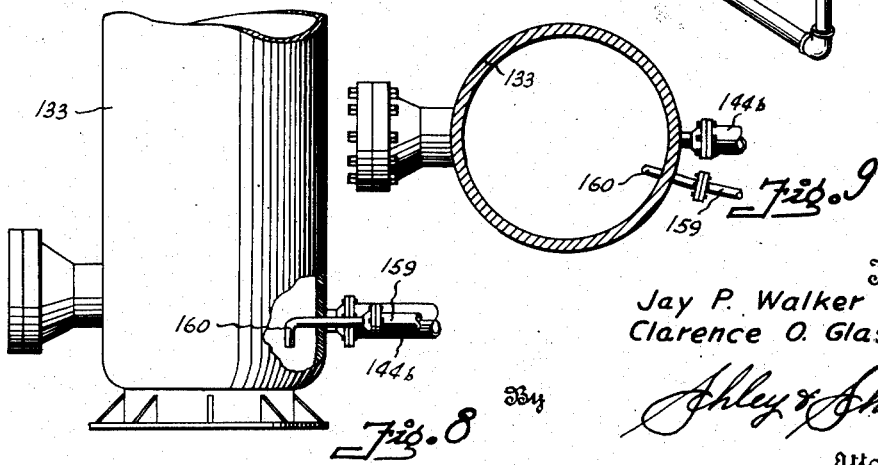

Patented Jan. 12, 1954

2,665,769

UNITED STATES PATENT OFFICE 2,665,769

METHOD AND APPARATUS FOR REMOVING CONDENSIBLE FLUIDS FROM GASEOUS STREAMS

Jay P. Walker and Clarence O. Glasgow, Tulsa, Okla., assignors to National Tank Company, Tulsa, Okla., a corporation of Nevada Application April 12, 1948, Serial No. 20,446

10 Claims. (Cl. 183—4.1)

This invention relates to new and useful improvements in dehydrating systems.

Natural gas frequently contains moisture which is in the form of water vapor and such gas has been referred to in the oil fields as wet gas and as distillate gas. When subjected to critical or low temperatures, the moisture in such gas causes freezing and the formation of gas hydrates which are very troublesome and cause clogging and failure of equipment of various sorts. In the interest of economically overcoming this difficulty, it is common practice to use sorbers which, in general, are tanks containing a sorbent material such as alumina and kindred materials. The wet gas is passed through the sorber, whereby the material therein sorbs the moisture and the gas is dehydrated. After a period of time, the sorbent material reaches its saturation point or so closely approaches it that the desired amount the moisture is not extracted from the gas. It is the practice to provide an extra or duplicate sorber so that the wet gas may be passed through one sorber while the sorbent material in the other sorber is being dried out.

Several methods have been employed to dry out the saturated sorbent material, and heat has been found to be the best medium. A common method is to provide a steam boiler and pass steam through the saturated sorbent material in the vessel. Such a system requires a condenser and a pump to force the water from the condenser back into the boiler and further, such systems require a constant supply of water. Another system which has been used includes an expensive and complex apparatus wherein a fluid is heated to the necessary degree and such hot fluid is passed through the saturated sorbent material. All of these systems require a considerable amount of equipment, which is expensive, and involve costly operation and maintenance.

The incoming gas stream, which is to be dehydrated, often contains in addition to moisture low percentages of relatively heavy or high boiling point hydrocarbons which require high temperatures for vaporization. Obviously, the introduction of such heavy hydrocarbons into the sorbent material results in contamination or "poisoning" of said material. Having high boiling points, the heavy hydrocarbons cannot be removed through vaporization without attaining excessive temperatures in the reactivation or regenerating fluid which may be employed. An additional disadvantage resides in the fact that hydrocarbon gas has been found most desirable for use as the regenerating fluid. When such gas is heated to the temperature necessary to vaporize any heavy hydrocarbons which may have deposited in the sorbent material, undesirable results ensue. Cooking and/or polymerization may occur both in the sorbent bed and in the unit which heats the regenerating fluid. This formation of solid particles or high boiling point liquids which eventually work their way into the sorbent bed, obviously is exceedingly harmful to the bed and accelerates the time at which it must be replaced.

Vertical separators may be used to remove any liquids or heavy hydrocarbons in the liquid phase from the incoming gas stream prior to its introduction into the sorbent bed. However, the utilization of such separators causes the dehydrating structure to be unwieldly and reduces the portability of the device. In addition on extremely large gas volumes separator sizes are prohibitive.

This invention contemplates the use of vertical separators for the purpose given and also contemplates the use of other types of separators when circumstances indicate the advisability of such substitution. When very large volumes of gas are to be handled, it has been found preferable to employ a horizontal type separator in advance of the sorbent bed to remove liquids and heavy hydrocarbons from the gas stream prior to its introduction into said sorbent material. The employment of a horizontal separator permits large volumes of gas to be handled in an efficient fashion whereby all those components of the gas stream which might contaminate or poison the sorbent bed are removed so completely that replacement of the sorbent material is greatly delayed and an obvious economic advantage along with increased efficiency results.

One object of the invention is to provide a dehydrating system employing gas instead of steam as the regenerating medium and involving a simple self-contained apparatus which is economical to operate and maintain.

A further object of the invention is to provide an improved dehydrating system utilizing a plurality of sorbent beds and automatically switching the gas stream from one bed to another by means of diaphragm valves which operate substantially instantaneously.

A particular object of the invention is to provide an improved dehydrating system wherein a self-contained body of water is heated to generate steam, which steam is utilized to heat a relatively cool gas and heat exchange is employed to condense the steam so that a continuous steam generating, heating and condensing cycle is correlated with said body of self-contained water, and the heated gas is passed through the saturated sorbent material, whereby the relatively cool gas which has been heated to such a temperature will effectively and efficiently dehydrate the saturated sorbent material when passed therethrough.

Another object of the invention is to provide an improved dehydrating system employing at least two dehydrating towers with means for alternately supplying a reactivating fluid to one of the towers when the sorbent or dehydrating material therein becomes saturated or approximately so, together with means for automatically switching the flow of reactivating fluid from one tower to the other tower and at the same time shutting off the flow of fluid to be dehydrated from said saturated tower and opening such flow to the other tower; such system being arranged either to exhaust from the system the vapors evolved during the reactivating step, or to introduce them into the fluid supply line to the towers.

An important object of the invention is to provide an improved dehydrating system of the character described, wherein the reactivating fluid after passing from the tower being regenerated is cooled and passed through a separating structure to remove condensed liquid therefrom, after which step the relatively liquid-free regenerating fluid may be reintroduced into the influent gas stream and thereby conserved.

Yet another object of the invention is to provide an improved dehydrating system of the character described wherein a relatively cool fluid is passed through the sorbent material after regeneration whereby said material is cooled prior to the introduction thereinto of the main stream of gas to be dehydrated.

A particular object of the invention is to provide an improved dehydrating system of the character described wherein the regenerating gas is passed through the towers in the same direction as the main gas stream whereby disturbing of the sorbent beds is precluded especially in instances where the gas stream contains relatively large quantities of distillate or other liquids.

Another particular object of the invention is to provide dehydrator towers having regenerating gas discharge means which remove bodies of liquids present within the towers without necessitating vaporization of the same whereby the liquids are removed as liquids at the beginning of the regeneration cycle and readily recovered from the effluent regeneration gas.

A further object of the invention is to provide an improved dehydrating system of the character described having novel control means for the regenerating gas.

A still further object of the invention is to provide an improved dehydrating system which is entirely self contained, employing a portion of the gas stream being dehydrated for the operation of all elements of said system, and which possesses a high degree of portability and may be moved from one location to another with a minimum of effort and difficulty.

A construction designed to carry out the invention will be hereinafter described together with other features of the invention.

Figure 2:
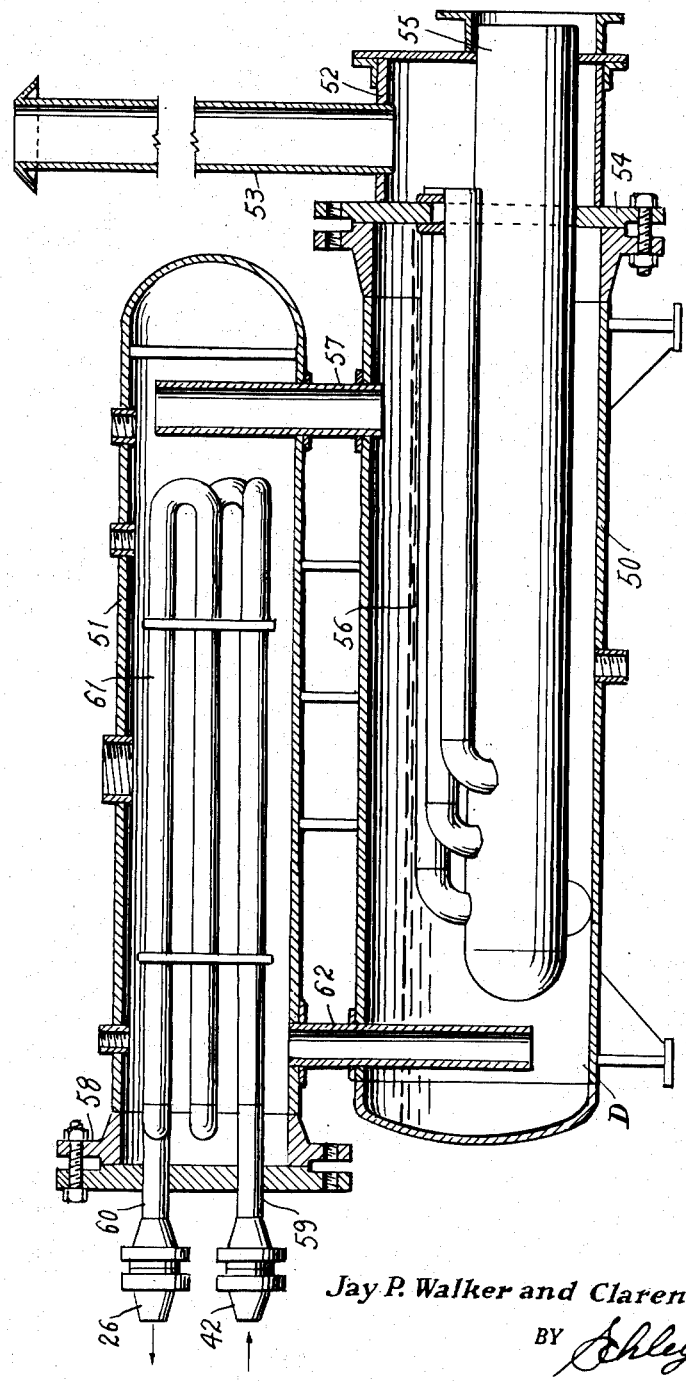
Figure 3:
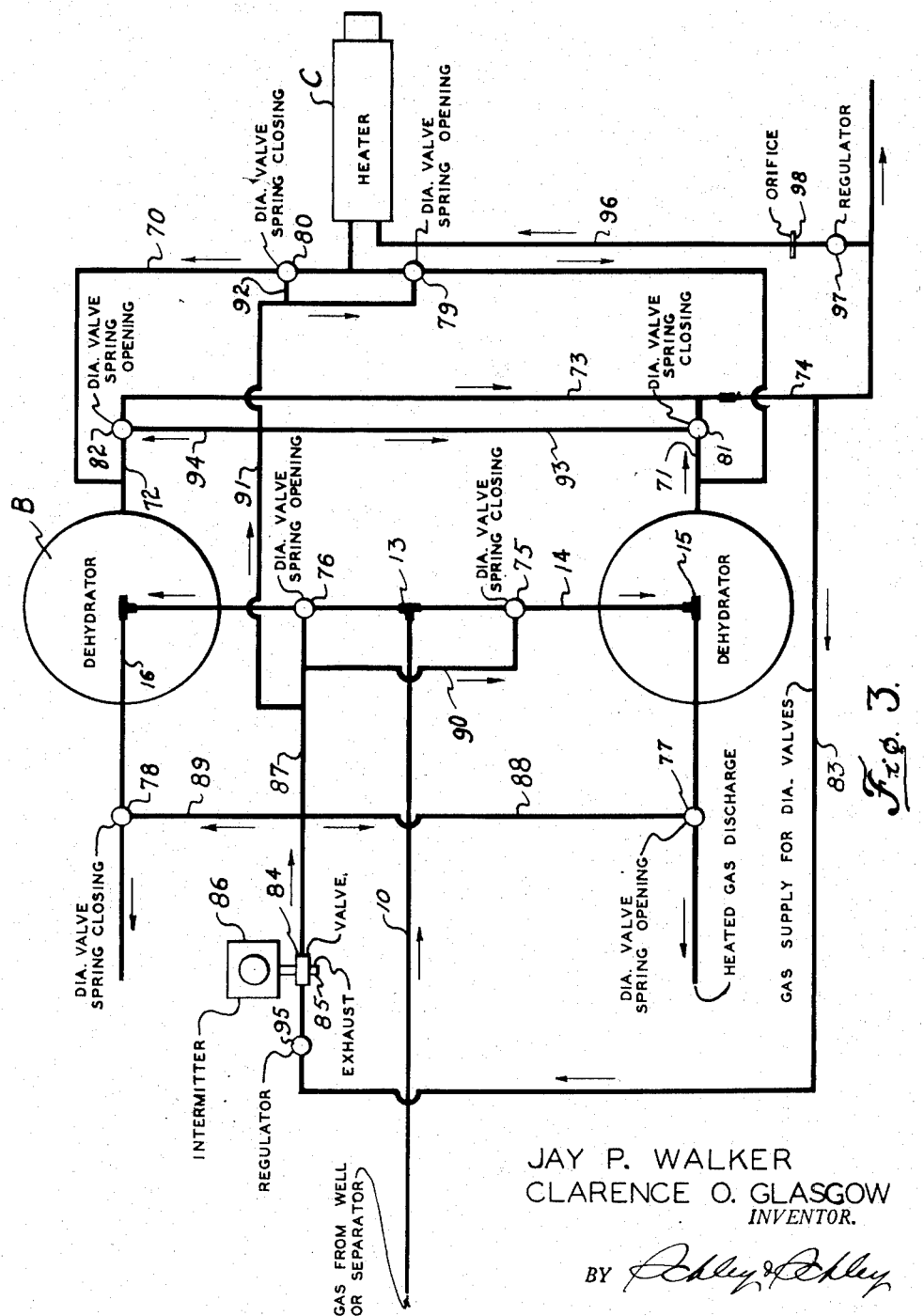
Figure 4:
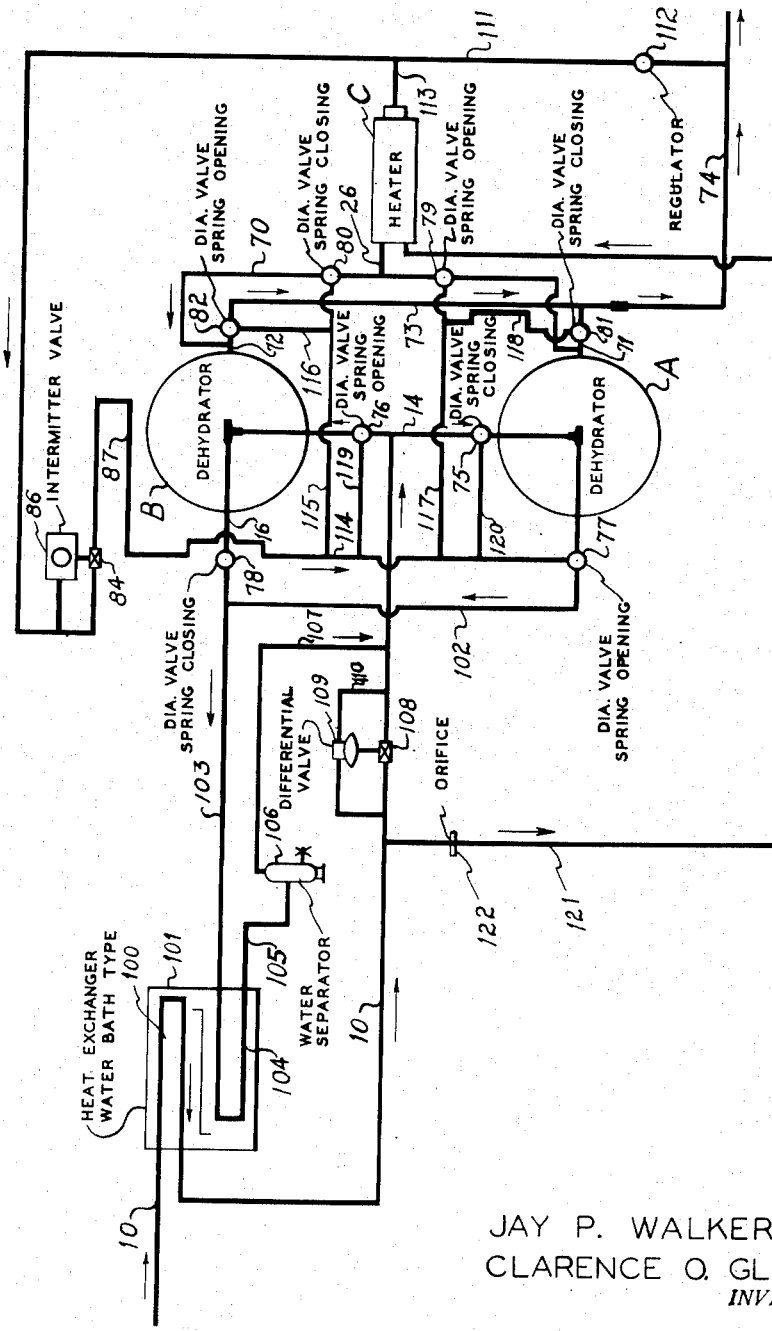
Figure 5:
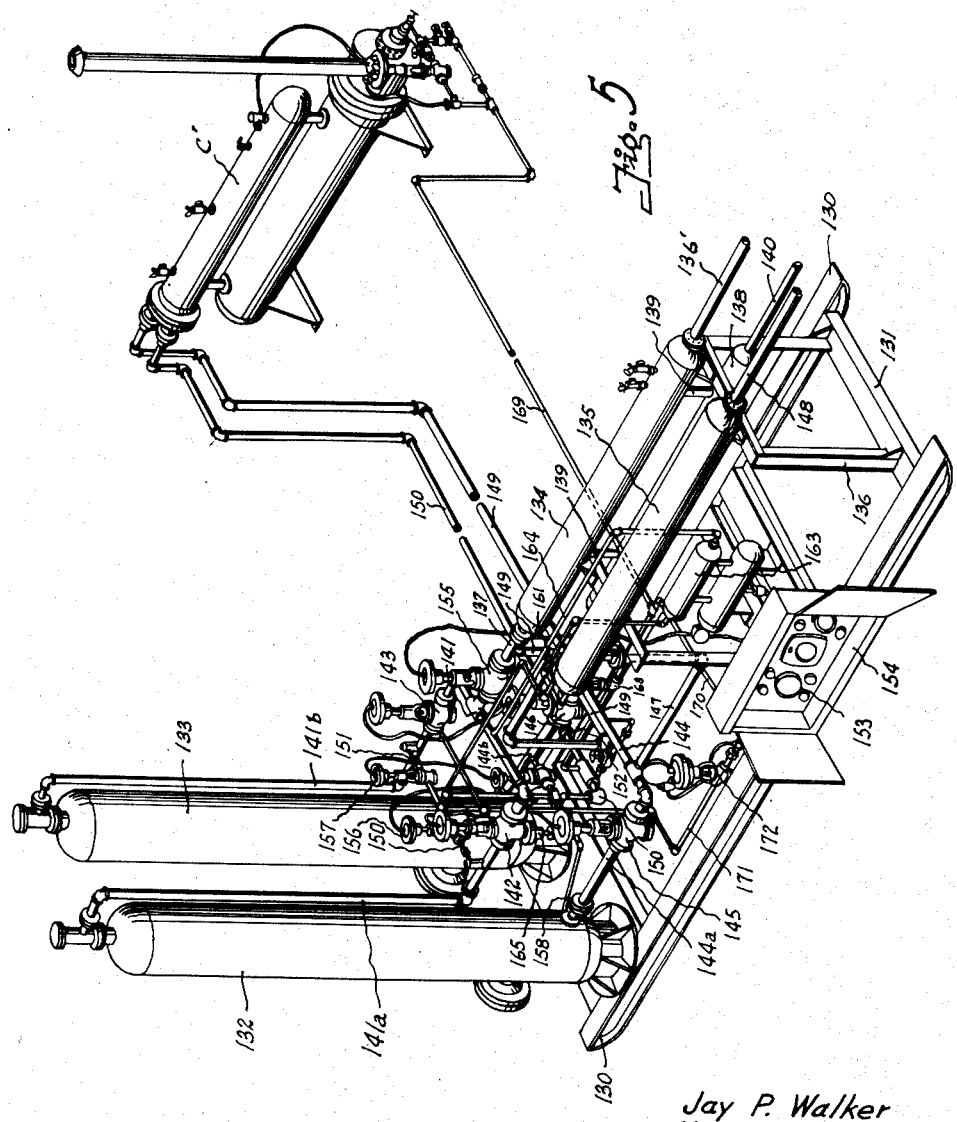

The invention will be more readily understood from a reading of the following specification and by reference to the accompanying drawing, wherein an example of the invention is shown, and wherein:

Fig. 1 is an elevation of an apparatus constructed in accordance with the invention, the same being a typical illustration, Fig. 2 is a vertical sectional view of a steam generator and heater, which may be used in this system, Fig. 3 is a diagrammatical view of the system equipped for automatic operation and wherein the vapors evolved during the reactivating step are exhausted from the system, Fig. 4 is a similar view of the system wherein the vapors are introduced into the line supplying fluid to the towers, Fig. 5 is a perspective view of a modified form of the system, employing a horizontal separator, Fig. 6 is a diagrammatical view of the modified form of the system illustrated in Fig. 5, Fig. 7 is an enlarged, fragmentary, isometric view of the tower end of the system shown in Fig. 5, Fig. 8 is a fragmentary, vertical, sectional view of the lower end of one of the towers showing the regeneration gas discharge, and Fig. 9 is a horizontal, cross-sectional view taken through one of the towers and looking downwardly.

This application is a continuation-in-part of our copending application, Serial No. 652,724, filed March 7, 1946, now abandoned.

In the drawings, the letters A and B designate duplicate sorbers; while the numeral 10 designates a wet gas supply line, such gas coming from any suitable source. The supply line connects with a T 11 from which a feed pipe 12 extends upwardly and is connected to a T 13 in a manifold pipe 14.

A riser 15 extends from the top of the sorber A, while a riser 16 extends from the top of the sorber B. Immediately above the sorbers, T's 17 are connected in the risers and the ends of the manifold pipe 14 are connected to these T's. In each riser, above its T 17, a cut-off valve 18 is connected and cut-off valves 19 are connected in the manifold pipe 14 on each side of the T 13. A by-pass pipe 20 connects the upper end of the riser 16 with a T 21 in the riser 15 located above the valve 18. During operation, one of the valves 19 is closed and the other valve 19 is opened; thus, wet gas is supplied only to one sorber. Since the risers are employed for carrying off the vapors evolved from dehydration, the valves 18 are alternately opened and closed, as will be obvious.

The lower portions of the sorbers A and B are connected by a manifold pipe 22 which has a T 23 connected in its medial portion. Cut-off valves 24 and 25 respectively are connected in the manifold pipe of each side of the T. A heated-gas pipe 26 is connected at one end with a T 27 connected in the pipe 22 between the sorber B and the valve 25; while a branch pipe 28 extends from a T 29 connected in the pipe 26 to a T 30 connected in the pipe 22 between the sorber A and the valve 24. A cut-off valve 31 is connected in the pipe 26 between the T 29 and the T 27.

The purpose of this arrangement is to alternately supply heated gas to the lower portions of the sorbers. It will be seen that with the valves 24 and 31 closed, the heated gas would be supplied by way of the branch pipe 28 to the lower portion of the sorber A. When it is desired to supply heated gas to the sorber B, the valve 31 is opened and a valve 32 connected in the branch pipe 28 is closed. The valve 25 is also closed.

For the purpose of convenience and economy in structure, the T 23 has connection with one end of a branch pipe 33 which is connected at its opposite end with a T 34 connected in a gas discharge pipe 35. When the sorber A is being reactivated, and the valves 24 and 31 are closed, the valve 25 may be opened to discharge treated gas from the sorber B. When the sorber B is being reactivated, the valves 32 and 25 are closed. If it should be desired to cut off the discharge of gas to the pipe 35, a valve 36 connected in the branch pipe 33 may be closed. For the purpose of supplying wet gas to the pipe 35, if it should be desired, said pipe is connected with the T 11 and includes a cut-off valve 37 which is located adjacent said T and is normally closed.

A gas by-pass pipe 38 has one end attached to a T 39 connected in the gas supply pipe 10 in advance of the T 11 and includes a cut-off valve 40 adjacent the T 39. The opposite end of the by-pass pipe is connected to a T 41 which, in turn, is connected in a gas feed pipe 42. The feed pipe 42 has one end attached to a T 43 connected in the gas discharge pipe 35 so that gas may be supplied to the pipe 42 from either the pipe 35 or the pipe 38. For supplying gas from another source, a T 44 is connected in the pipe 42 beyond the T 41 and one end of a gas supply pipe 45 is connected to the T 44. In order to control the supplying of fuel, valves 46, 49 and 48 are connected respectively, in the pipes 38, 45 and 42; the valve 48 being located between the T's 41 and 43.

The gas feed pipe 42 and the heated gas conducting pipe 26 are connected to a heater indicated generally by the letter C. The particular structure of this heater is not involved, except insofar as it fits into the system. It may be constructed of two vessels 50 and 51, as shown in the drawings, or it may be constructed in a single vessel or in any other manner. As hereinbefore pointed out, one of the features of the system is economy in operation and maintenance, a considerable saving in the cost of equipment and a reduction in the number of appliances used. Frequently, gas for fuel purposes is purchased, and if it is not purchased it must be supplied; therefore, it has a market value and any saving in the quantity of fuel gas used is important. Further, water for a steam boiler is not always available, and if it must be constantly or periodically supplied, an additional expense is incurred and frequently such water must be treated or the heater frequently cleaned.

In Fig. 2, the heater C is illustrated in section and this type of heater has been found satisfactory in this system. The vessel 50 will be referred to as the generating vessel and the vessel 51 as a steam vessel. A fire box 52 is connected to the right-hand end (Fig. 2) of the generating vessel and is provided with a stack 53, the generating vessel being closed off from the fire box by a head 54. A burner tube 55 extends through the fire box and longitudinally into the generating vessel 50, terminating short of the opposite end thereof. Return tubes 56 extend from the tube 55 through the head 54. The generating vessel is provided with a body of water D, the level of which is sufficiently above the tubes 56 to maintain the heating elements submerged at all times, but not to completely fill said vessel. This body of water is sealed in the vessels and it is not necessary to replenish the same, provided there are no leaks in the enclosure. This water may be treated so as to remove therefrom constituents which would not be desirable in the generating of steam.

The steam vessel 51 is longitudinally supported on top of the generating vessel 50 and both vessels may be covered with a suitable insulating material (not shown) to retain heat. A steam flue 57 extends from the top of the generating vessel through the bottom of the steam vessel and terminates adjacent the top of the steam vessel so as to deliver the steam in the upper longitudinal stratum thereof. A head 58 is secured to the left-hand end (Fig. 2) of the vessel 51 and carries the inlet connection 59 and the outlet connection 60 of a coil bundle 61 extending longitudinally in the steam vessel. The inlet 59 is connected with the pipe 42, while the outlet 60 is connected with the pipe 26.

A suitable gas burner (not shown) may be inserted in the heater tube 55 and may be thermostatically or pressure controlled if desired, such being a common practice in this art. When the body of water D is heated to the proper temperature, steam will be generated and such steam will pass by way of the flue 57 into the upper portion of the steam vessel. A return flue 62 extends from the bottom of the steam vessel adjacent the head 58, down into the generating vessel and terminates in the lower portion of the body of water D. The steam being delivered to the upper stratum of the steam vessel will travel along the coil bundle 61 in seeking an escape by way of the flue 62.

The relatively cool gas flowing through the coil bundle 61 will have an elongated travel path, and by heat exchange with the steam will be heated to the desired temperature. It is pointed out that owing to heat transfer from the steam to the gas, condensation of the steam will occur. However, since only the latent heat of vaporization is involved, there will be substantially no temperature drop in degrees, Fahrenheit. In view of this phenomena, the condensate will have a temperature very close to that required to generate steam at the pressure under which the heater is operated; thus, it is possible to maintain a substantially constant temperature in the vessels, particularly if heat controls are employed. Steam at a pressure of 300 pounds per square inch would have a temperature of about 422° F. and this would supply sufficient heat transfer to meet the demands of this system. However, these values are merely exemplary and the invention is not limited thereto.

The condensate will flow down the return flue 62 to the body of water D. Steam is thus generated from a self-contained body of water in a continuous cycle involving the generation of steam, the heating of gas, the condensation of the steam and the return of the condensate to said body of water. Obviously, the condensate will not be very many degrees below the boiling point at the pressure maintained in the enclosure, and therefore, regeneration of steam is economically obtained. This assures economy in the heat load, as well as high efficiency in steam generating and heating.

It is believed that the operation of the system will be clear from the description hereinbefore given. No attempt has been made to illustrate the details of the sorbers, but each has been broken away to indicate moisture sorbent material E. It will be assumed that the material E in the sorber A has become saturated, and it is desired to reactivate the same. The valve 19 to the sorber A is closed, and the valve 19 to the sorber B is opened, whereby gas from the supply pipe is delivered only to the sorber B. The valve 18 of the sorber B is closed, while the valve 18 of the sorber A is opened. The valve 37 is also closed. The operator has previously selected one of the valves 46, 49 or 48 to supply gas to the heater C, and it will be assumed that he has elected to supply gas by the pipe 45 and thus the valve 49 will be opened, while the valves 46 and 48 are closed. As a safety measure, the valve 40 may also be closed. As it is not desired to supply reactivating gas to the sorber B, the valves 24 and 31 are closed, and the valve 32 is opened.

The relatively cool gas supplied by way of the pipes 45 and 42 to the coil bundle 61 is heated and then discharged into the pipe 26, from which it passes by way of the pipes 28 and 22 to the bottom of the sorber A, the valve 24 having been closed. The heated gas passes upwardly through the sorbent material E of the sorber A and the vapors evolved and any remaining gas, escape by way of the pipe 15. This is continued for a period of time, which may be several hours, until the reactivation of the sorbent material has been completed. When this is done, the operation is reversed and it is not believed necessary to explain the same in detail.

The system which has been described and illustrated in Figs. 1 and 2 is adaptable to automatic operation and such an arrangement is shown in Fig. 3. In this form the towers A and B are employed and are connected similarly to the manner shown in Fig. 1; the wet gas supply line 10 being connected directly to the T 13 in the manifold pipe 14. The towers have the risers 15 and 16 and the manifold pipe 14 being connected in these risers by the T 17. If desired, the risers could be connected by the pipe 21, but such a connection is not illustrated in Fig. 3. The heater C is connected with the line 26, however, this line in Fig. 3 is connected into a manifold line 70 which has its opposite ends connected in branch pipes 71 and 72 extending from the lower portion of the towers A and B, respectively. The outer ends of the branch pipes connect to a discharge manifold line 73, which is connected at one end with a discharge line 74.

In the fluid supply manifold line 14, valves 75 and 76, respectively, are connected similarly to the valves 19; while in the risers 15 and 16, valves 77 and 78 are connected similarly to the valves 18. The valve 75 of the tower A is of the diaphragm spring-closing type; while the valve 77 in the riser 15 of tower A is of the diaphragm spring-opening type. These valves are well known in the art and are commonly sold in the open market, wherefore it is not considered necessary to illustrate the same. Such valves employ a diaphragm arranged to be moved in one direction by a pressure fluid and in the opposite direction by a spring. Since the valves 75 and 77 operate oppositely, one is open when the other is closed. The valve 76 is a diaphragm spring-opening valve and the valve 78 is of the diaphragm spring-closing type. These valves operate in the same relation as the valves 18 and 19 of Fig. 2.

A diaphragm spring-opening valve 79 and a diaphragm spring-closing valve 80 are mounted in the reactivating supply line 70 in the same order as the valves 31 and 32. A diaphragm spring-closing valve 81 is mounted in the branch pipe 71 of tower A between the pipe 70 and the pipe 73, while a diaphragm spring-opening valve 82 is connected in the branch pipe 72 of tower B between the pipes 70 and 73. These valves function the same as valves 24 and 25. All the diaphragm valves are marked in Fig. 3 as to whether they are spring opening or spring closing.

For supplying gas to the diaphragm valves, a by-pass line 83 leads from the wet gas discharge pipe to an intermitter valve 84 which connects with an exhaust 85 when closed. The valve 84 is operated with an ordinary clock controlled intermitter 86, such intermitters being in common use in the oil and gas fields. A manifold line 87 leads from the valve 84 directly to the valve 76. A lateral 88 leads from the line 87 to the valve 77, while a lateral 89 leads from the line 87 to valve 78. A lateral 90 leads from the manifold line 87 to the valve 75.

For supplying gas to the other diaphragm valves, a bypass line 91 leads from the line 87 to the valve 79 and to the valve 80, by a branch 92. A lateral 93 leads from the line 91 to the valve 81, and a lateral 94 leads from said line 91 to the valve 82. A regulator 95 is connected in the by-pass line 83 in advance of the intermitter valve 84 to regulate the pressure of the fluid to the valves.

For the purpose of illustration, it will be assumed that the intermitter 86 is set to hold the valve 84 open for a period of 12 hours, whereby gas under pressure from the by-pass line 83 is supplied to the diaphragm valves, and then for a period of 12 hours to hold the intermitter valve 84 closed. Thus, during the first period, the diaphragms would be active against the springs of the valves and during the following period the springs would be active against the diaphragms. Referring to Fig. 3, it will be assumed that the intermitter is operating to supply gas to the valves. Thus, the valve 75 will be open and the valve 76 will be closed. Therefore, wet gas to be dehydrated will be supplied to tower A and shut off from tower B. Valve 77 will be closed and there will be no escape through valve 77. During this first period, the tower B is being reactivated and therefore, valve 78 will be open.

Valve 81 will be open and thus the dehydrated gas may escape through branch pipe 71 to pipes 73 and 74. Valve 79 will be closed so that heated gas from the heater C will not pass to the tower A, but valve 80 will be open and valve 82 will be closed, so that heated gas may pass to tower B to reactivate the same. Since all of the valves are being operated by gas pressure during the first 12 hour period, the springs of the valves will be compressed and when the intermitter enters the second 12 hour period, the flow of gas to the diaphragms of the valves will shut off, whereby the springs will reverse the positions of the valves. When this occurs, wet gas will be supplied to the tower B and shut off from the tower A. Heated gas will then be supplied to the tower A only.

The coil 61 of the heater C is supplied with gas from the line 74 by a line or pipe 96, which has connected therein a pressure regulator 97 and an orifice plate 98, whereby the pressure of the gas is reduced through the regulator and the amount delivered to the heater, at the reduced pressure, is controlled through the orifice plate. It is desirable to control the amount of gas which is heated for reactivating the dehydrating material in the towers.

By using the proper size orifice in the plate 98, the proper amount of heated gas will be supplied to a tower during a reactivating period or cycle, not only to reactivate the material of one tower, but also to complete the reactivation by the time the other tower has become fully saturated. This is important not only in the matter of timing, but with regard to the effect upon the dehydrating material which is being reactivated. If the reactivation is over done or is completed before the end of the cycle and thus becomes excessive, the dehydrating material will be injured and eventually broken down. If a period of 12 hours is selected as the cycle of reactivation, then heated gas will be supplied at such a rate that full reactivation will consume 12 hours. The regulator 97 and orifice plate 98 thus become important in this respect. The duration of the cycle is arbitrary, but usually will be controlled by the time required for a tower to become saturated and thus necessitate reactivation.

In the system shown in Fig. 3, the gas vapors which escape from the risers 15 and 16 are not recirculated in the system and so far as the system itself is concerned, such gas is lost therefrom. In Fig. 4, a system is diagramatically illustrated which is similar to that shown in Fig. 3, except as to the exact hook-up and the recirculation of the reactivating gas. In Fig. 4, the same numerals are used for elements which are substantially the same as those in Fig. 3 and their description will not be repeated.

In Fig. 4 a heat exchanger coil 100 is connected in the wet gas supply line 10. This coil may be disposed in any type of heat exchanger as indicated generally at 101. A line 102 leads from the discharge end of the riser 15 and connects with a line 103 which leads from the riser 16. The line 103 connects with a coil 104 in the heat exchanger which is located in heat exchange relation with the coil 100. Thus, since the wet gas will have a much lower temperature than the reactivation vapors flowing through the coil 104, such vapors will be cooled and water vapors will be condensed. A line 105 leads from the coil 104 to a separator 106, whereby the water flowing with the gas will be separated therefrom. A gas line 107 leads from the separator to the wet gas supply line 10.

It is obvious that in order to introduce the gas and vapors from the line 107, the pressure of such gas and vapors must be higher than the gas pressure in the line 10. In advance of the pipe 107, a diaphragm spring-closing valve 108 is connected in the line 10. The operating motor 109 for this valve is connected in a by-pass line 110 connected around the valve 108. This valve is set to operate on a fixed pressure differential and such valves are known in the art as "differential" valves.

As an illustration the upstream side of the line 10 may carry a pressure of 1250 lbs. per square inch and by setting the valve 108 at a differential pressure of 50 lbs. per square inch, a downstream pressure of substantially 1200 lbs. per square inch may be maintained in the downstream side of said line. Thus, the wet gas, which is being reactivated, flows through the tower, at substantially 1200 lbs. per square inch.

For operating the various motor or diaphragm valves, a by-pass line 111 leads from the gas discharge line 74 and a pressure regulator 112 is connected in said line adjacent the line 74 because the motor valves usually operate at a relatively low pressure. Gas from the line 111 may be supplied to the burner of the heater C by a branch pipe 113. The intermitter 86 and its valve 84 are connected in the line 111 and the line 87 leads from said valve to the valve 78. A manifold line 114 leads from the line 87 to the valve 77. A lateral 115 leads from the line 114 to the valve 80 while a branch line 116 therefrom, leads to the valve 82.

A line 117 leads from the line 114 to the valve 79 and connects with a lateral 118 leading to the valve 81. A lateral 119 leads from the line 114 to the valve 76, while a lateral 120 leads from the line 114 to the valve 75. The system in Fig. 4 operates the same as the system in Fig. 3, with the exceptions hereinbefore pointed out.

For supplying gas from the upstream side of the line 10 a line 121 leads to the heat exchange coil 61 of the heater C. This line includes an orifice plate 122 which controls the amount of gas supplied to the heater. The heated gas under substantially 1250 lbs. per square inch pressure, is supplied to the towers A and B by way of the pipe 70, and thence alternately through the pipes 71 and 72. Since the gas discharged through the risers 15 and 16 and finally entering the line 10 will be under a pressure well above 1200 lbs. per square inch, such gas and/or vapors will readily flow into the downstream side of the line 10. If a larger amount of gas is required to reactivate a tower, the pressure differential across valve 108, is increased and if a lesser amount is desirable, the pressure differential is decreased.

In Figs. 5 and 6 is illustrated a modified, and in many respects the preferred, form of the invention. This modification employs a horizontal separator of the type as illustrated in the patent to Dixon, No. 2,349,944, patented May 30, 1944, such separator being introduced into the gas stream supply line prior to the sorbent containing towers. The modification includes a pair of elongated skids 130 disposed in parallel fashion and joined by transverse members 131. A pair of towers 132 and 133 are carried upon one end of the base so constituted, said towers containing a suitable sorbent material and being similar in all substantial respects to the towers A and B previously described. The before-mentioned horizontal separator 134 is disposed upon the opposite end of the base adjacent an elongate heat exchanger 135, the latter two elements being suitably supported upon uprights 136. The heating element C' is disposed at some distance from the dehydrating unit to eliminate fire hazards and is similar in all respects to the heating unit C described hereinbefore.

The influent gas enters the horizontal separator 134 through an inlet pipe 136' and passes from the opposite end of said separator by way of a pipe 137. Within the separator, substantially all solids and liquids are removed from the gas stream and drain into a chamber 138 disposed below the separator 134 and connected thereto by upright pipes 139. This removed material is exhausted from the chamber 138 through a pipe 140. As pointed out hereinbefore, the removal of this material from the incoming gas stream is of considerable advantage in preventing contamination and poisoning of the sorbent material within the towers 132 and 133. Since many problems arise in removing such contaminating material from the towers after it has once been introduced, it is highly advantageous to prevent such introduction in the first place. The separator 134 accomplishes this result while at the same time permitting the passage of large volumes of gas without excessive resistance or reduction of pressure and without any loss of efficiency.

The pipe 137 is connected into a manifold 141 having one branch 141a leading to the upper end of the tower 132 and one branch 141b leading to the upper end of the tower 133. A spring-opening diaphragm-operated valve 142 is positioned in the branch 141a and a spring-closing diaphragm-operated valve 143 is provided in the branch 141b. Thus, the gas entering the manifold 141 is directed into the upper end of the tower 132 when the valves 142 and 143 are in their normal positions. However, when gas pressure is applied to the diaphragms of said valves, this flow is switched from the tower 132 to the tower 133.

A similar manifold 144 is connected into the lower ends of the towers 132 and 133 by branch pipes 144a and 144b, respectively. A spring-opening diaphragm-operated valve 145 is provided in the branch pipe 144a, and a spring-closing diaphragm-operated valve 146 is provided in the branch 144b. The latter valves are operated by the same gas pressure as the valves 142 and 143 so that in the normal positions of said valves, gas may exhaust from the tower 133 into the manifold 144 while the branch pipe 144b is shut off. Upon application of gas pressure to the valves, the tower 132 is shut off and the tower 133 may exhaust to the manifold 144.

A pipe 147 is connected from the manifold 144 into the jacket of the heat exchanger 135 and passes therefrom by means of a pipe 148 extending from the opposite end of said heat exchanger. This gas passing through the heat exchanger is relatively cool and is employed, as will be explained more fully hereinafter, for the purpose of cooling the regenerating fluid coming from one of the sorbing towers.

A branch pipe 149 is connected into the pipe 137 and extends to the heater unit C' while a return pipe 150 runs from the heater unit to a manifold 151 extending between the branch pipes 141a and 141b. A control orifice 152 is provided in the pipe 150 and connected through suitable pressure conductors to the usual type of automatic flow controlling device 153 mounted within a control housing 154 at one side of the base 130. The control unit 153 is in turn connected to a suitable differential motor valve 155 positioned in the pipe 137, but downstream of the juncture of the pipe 149 with the pipe 137. This arrangement permits the maintenance of the desired flow of reactivating fluid through the pipes 149 and 150. The flow control unit 153 may be set to maintain a constant pressure differential across the orifice fitting 152, such maintenance being accomplished by regulation of the valve 145 which in turn causes the back pressure within the pipes 149 and 150 to remain constant and thereby maintains a constant flow therethrough. Thus, a constant rate of flow of reactivating fluid is assured, along with means for setting such flow.

In the previous forms described (Fig. 4), the orifice fitting was connected into the regenerating gas supply line adjacent its juncture with the incoming gas line. In some instances when cold weather is encountered or the incoming gas is near the hydrate point, freezing may occur in and below the orifice because of the gas expansion and cooling existent in the latter. In the present form, it is to be noted that the orifice 152 is mounted in the return line 150 adjacent its juncture with the manifold 151. The regenerating gas passing through the orifice fitting in this position is already heated and the possibility of forming hydrates is substantially eliminated.

It is also to be noted that the heated regeneration gas supply line connects into the pipes 141a and 141b leading to the upper ends of the towers. By employing this structure, the regenerating gas passes downwardly through the towers in the same direction as the main gas stream and the physical characteristics of the sorbent beds are maintained as desired. It has been found in some cases that reverse flow of the regenerating gas causes the finely divided portions of the beds under the impetus of the gas stream and of any liquids which may have collected in the beds. These fines which are flowed upwardly accumulate at the tops of the beds and form a crust or cake which obstructs future flow of gas.

This phenomena has been found particularly prevalent where the gas being dehydrated contains considerable amounts of distillate which accumulate in the towers during the dehydration cycle. Upon beginning of the regeneration cycle, these liquids wash the fines toward the tops of the towers if the regenerating gas is admitted from the bottom. By admission of the gas from the top of the towers and flowing of it in the same direction as the main gas stream, the sorbent beds remain undisturbed and the undesirable results recited are not encountered.

A spring-closing diaphragm-operated valve 156 is connected in the manifold 151 adjacent the branch pipe 141a, and a spring-opening diaphragm-operated valve 157 is connected into the manifold adjacent the branch pipe 141b whereby the said two valves control the flow of regenerating fluid into their respective branch pipes. In one position of the valves, flow is directed into one branch pipe and therefore into one tower, while in the other position of the valves, the flow is directed into the upper end of the opposite tower.

Regenerating gas discharge pipes 158 and 159 are connected into the lower ends of the towers 132 and 133, respectively, adjacent the points of connection of the branch pipes 144a and 144b. As illustrated in Figs. 8 and 9, the pipes 158 and 159 have their inner ends disposed within the interiors of the towers and directed downwardly in the form of an elbow or gooseneck 160. With this structure, any liquid which may be present in the lower ends of the towers is discharged immediately through the pipes 158 and 159 when regenerating gas is admitted and thereby removed from the towers without being vaporized by the heated regeneration gas. These liquids are subsequently removed as liquids in a water knockout to be described hereinafter, and are thus recovered in toto. If they were vaporized and then subsequently recovered by condensation, portions of them might be lost. However, with the present arrangement, the accumulated liquids are not vaporized and their full and complete recovery is assured. At the same time, the deleterious effect of liquid passing through the sorbent material, as previously described, is avoided and the beds of sorbent material are maintained in a desirable working condition.

Another desirable result of this bottom take-off is to dry the bottoms of the sorbent beds prior to the readmission of the main gas stream. Thus, slugs of liquid cannot be picked up by the main gas stream as it exits from the tower, and carried into the balance of the system to disrupt the control elements and cause other disadvantageous effects.

The outer ends of the pipes 158 and 159 are joined into a discharge pipe 161 leading to a coil 162 disposed within the heat exchanger 135. The return branch of the coil 162 is connected into one end of a suitable water knockout 163, while the discharge line 164 of the water knockout is connected into the manifold 141.

For controlling the flow of regenerating gas from the towers, a spring-closing diaphragm-operated valve 165 is connected into the gas discharge pipe 158, and a spring-opening diaphragm-operated valve 166 is connected into the pipe 159. These latter diaphragm valves operate at the same time as the valves 156 and 157 and thus permit the proper switching of the flow of regenerating gas.

In this manner, regenerating gas is drawn from the pipe 137 through the pipe 149 and is heated in the unit C'. The hot regenerating gas passes from the pipe 150 to the manifold 151 and thence into the upper end of whichever of the towers is presently being reactivated. The regeneration gas passes from the lower end of the tower being reactivated into the pipe 162 and thence to the heat exchanger 135 wherein the hot gas is cooled by the main effluent gas stream, and the vapors which the regenerating gas is carrying are condensed. Upon passing through the water knockout 163, these condensed vapors are removed so that a relatively dry gas returns via the pipe 164 to the manifold 141. Upon the application of gas pressure to the diaphragm of the valves 156, 157, 165 and 166, this flow is diverted so that the regeneration gas is directed through the other tower, such diversion taking place instantaneously with the diverting of the main gas stream from one tower to the other.

A portion of the dry gas passing from the device is carried by a pipe 165' to a heater jacket 166' surrounding a portion of the pipe 150. The gas is heated in the jacket to prevent gas hydrate formation in subsequent pressure reductions and passes from the jacket through a pipe 167 containing a pressure reducing regulator 168. Downstream of the regulator 168, the gas is conducted by a pipe 169 to the burner of the heating unit and by a pipe 170 to the control unit 151. This gas is also conveyed to a pipe 171 which leads to the diaphragms of all of the various diaphragm operated valves with the exception of the motor valve 153. A time controlled intermitter 172 is connected into the pipe 171, said intermitter being substantially identical to the intermitter 86 previously described and functioning to control the cycles of operation of the dehydrating system.

As illustrated in Fig. 6, a temperature-responsive element 173 is connected into the pipe 161 which conducts the hot regenerating gas or fluid from the towers 132 and 133 to the heat exchanger 135. This temperature-responsive element is connected by a suitable conductor 174 to a three-way valve 175 positioned in the regeneration gas conduit 149 leading to the heating unit C'. The valve 175 may be of any suitable type, such as solenoid or diaphragm operated, and functions to by-pass the regeneration gas around the heating unit so that said gas passes directly to the conductor 150 without being heated in said unit.

At the beginning of the regeneration cycle, the regeneration gas may be entering the upper end of the tower being regenerated at a temperature of 350° to 400° F. Obviously, the heat content of this gas is dissipated in the tower, but as the regeneration of the sorbent material progresses and the separated liquids are vaporized therefrom, the temperature of the regeneration gas leaving the lower end of the tower naturally increases. When this outlet temperature reaches a point in the neighborhood of 275° or 300° F., it may be assumed that the entire bed of sorbent material had been heated to this temperature and that all liquids removable at this temperature have been vaporized therefrom. It has been found desirable to cool the sorbent beds to some extent before the full volume of gas being treated is switched into said beds. Therefore, the valve 175 is employed to effect such a cooling operation. The temperature-responsive element 173 may be set to operate at any desired temperature, such as 275° F. or 300° F. When the outlet regeneration gas reaches this temperature and the element 173 is actuated, it in turn actuates the three-way valve 175 which shuts off the flow of regeneration gas to the heater C' and directs such gas directly into the return line 154. In this manner, for the latter part (approximately 30-60 minutes) of the regeneration cycle, relatively cool gas is passed through the tower which has just been reactivated, such gas serving to cool the tower prior to the introduction thereinto of the full volume of the gas stream passing through the system. By the time the cycle is ended and such full flow is established, the tower will have reached the proper operating temperature. It is pointed out that the volume of cool regenerating gas passing through the tower at the end portion of the cycle is not sufficiently large as to cause any appreciable degree of saturation of said tower so that the latter carries out its dehydrating function without any degree of impairment. Since the temperature-responsive element 173 is positioned in the pipe 162' through which regeneration gas from both of the towers passes, it functions to provide a cooling period for both towers near the end of their regeneration cycles.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of removing condensible fluids from gaseous streams of varying volume of flow which includes passing the major portion of the gaseous stream through a first sorptive zone in a continuous fashion, drawing off a minor portion of the gaseous stream of substantially constant volume prior to the introduction of the latter into the sorptive zone, reducing the pressure of the major portion of the gaseous stream subsequent to the drawing off of the minor portion of the gaseous stream, heating the minor portion of the gaseous stream, continuously measuring the rate of flow of the minor portion and continuously regulating the reduction in pressure of the major portion of the gaseous stream in accordance with the rate of flow of the minor portion thereof, passing the heated minor portion of the gaseous stream through a second sorptive zone, cooling the minor portion of the stream by passing the same in heat exchange relationship with the major portion of the stream, then removing condensible fluids from the cooled minor portion of the gaseous stream subsequent to its passage through the second sorptive zone, and then conducting the minor portion of the gaseous stream into the major portion of said stream subsequent to the pressure reduction of the latter.

2. The method as set forth in claim 1, and by-passing a portion of the treated gaseous stream subsequent to its passage through the first sorptive zone, reducing the pressure of the by-passed portion, and employing the by-passed portion for the heating of the minor portion of the gaseous stream.

3. The method as set forth in claim 1, wherein the major and minor portions of the gaseous stream are alternately flowed through the first and second sorptive zones and the heated minor portion of the gaseous stream is passed through the sorptive zones in the same direction as the major portion of the gaseous stream.

4. The method of removing condensible fluids from gaseous streams of varying volume of flow which includes passing the major portion of the gaseous stream through a first sorptive zone in a continuous fashion, drawing off a minor portion of the gaseous stream of substantially constant volume prior to the introduction of the latter into the sorptive zone, reducing the pressure of the major portion of the gaseous stream subsequent to the drawing off of the minor portion of the gaseous stream, continuously measuring the rate of flow of the minor portion of the stream and continuously regulating the reduction in pressure of the major portion of the gaseous stream in accordance with the rate of flow of the minor portion thereof, heating the minor portion of the gaseous stream, withdrawing accumulated liquids from a second sorptive zone, passing the heated minor portion of the gaseous stream through the second sorptive zone, cooling the minor portion of the stream by passing the same in heat exchange relationship with the major portion of the stream, then removing condensible fluids from the cooled minor portion of the gaseous stream subsequent to its passage through the second sorptive zone, and then conducting the minor portion of the gaseous stream into the major portion of said stream subsequent to the pressure reduction of the latter and prior to the introduction thereof into the first sorptive zone.

5. The method of removing condensible fluids from a gaseous stream of varying volume of flow which includes, conducting the gaseous stream through a sorptive zone to remove condensible fluids therefrom, discharging the treated gaseous stream from said zone, drawing off a minor portion of the gaseous stream of substantially constant volume prior to the introduction of the latter into the sorptive zone, heating said minor portion, conducting the heated minor portion of the gaseous stream through a second sorptive zone to drive off condensed fluids from said zone, cooling the minor portion of the stream by passing the same in heat exchange relationship with the major portion of the stream, then removing the driven-off condensed fluids from the cooled minor portion of the gaseous stream, reducing the pressure of the major portion of the gaseous stream prior to its introduction into the first sorptive zone and subsequent to the drawing off of the minor portion of the gaseous stream, continuously measuring the rate of flow of the minor portion of the stream and continuously regulating the reduction in pressure of the major portion of the gaseous stream in accordance with the rate of flow of the minor portion thereof, reintroducing the minor portion of the gaseous stream after the removal of the condensed fluids therefrom into the major portion of the gaseous stream, said introduction taking place subsequent to the reduction in pressure of the major portion of the stream and prior to the introduction of said stream into the first sorptive zone, and alternately directing the flow of the major and minor portions of the stream through the sorptive zones.

6. The system of removing condensible fluids from gaseous streams which includes, a pair of vessels containing sorbent material, means for conducting the gaseous stream alternately to each of the vessels, means for carrying off the treated gaseous stream from the vessels, variable means for reducing the pressure of the gaseous stream prior to its introduction into the vessels, a conductor communicating with the gaseous stream prior to its pressure reduction for conducting a minor portion of said stream separately thereof, control means for measuring the rate of flow of the minor portion of said stream, said control means being connected to the variable pressure reduction means for regulating the latter to maintain the minor portion of the stream at a substantially constant rate of flow, a heater through which the minor portion of the stream passes, a conductor leading from the heater and communicating with each of the vessels for alternately conveying the heated minor portion of the gaseous stream to said vessels, a second conductor for carrying off the minor portion of the gaseous stream from the vessels, a heat exchanger connected into the gaseous stream, said second conductor communicating with the heat exchanger for cooling the minor portion of the gaseous stream subsequent to its passage through the vessels, means for removing condensed fluids from the minor portion of the gaseous stream subsequent to its cooling, a conductor leading from the latter means and communicating with the gaseous stream downstream of the pressure reduction means, and means for alternately switching the flow of the gaseous stream and the minor portion thereof between said vessels.

7. The system for removing condensible fluids from gaseous streams which includes, a pair of towers containing sorbent material, a line for supplying a wet gas to the towers, valves in the line for controlling the supply of wet gas to the towers, a line for discharging treated gas from the towers, valves in the second line for controlling the discharge of treated gas from the towers, a heat exchanger through which the gaseous stream flows, a line for supplying a reactivating gas to the towers, valves in the latter line for controlling the supply of reactivating gas to the towers, a line for conducting the reactivating gas from the towers, the latter line communicating with the lower extremities of the towers so as to draw off accumulated liquids therefrom, valves in the latter line for controlling the conducting of the reactivating gas from the towers, means for automatically actuating the valves alternately in each line to alternately supply wet gas and reactivating gas to each tower and to automatically cut off alternately the escape of treated gas and reactivating gas, rate of flow measuring means in one of the reactivating gas lines, a control unit connected to the measuring means and operated thereby, and a variable pressure reducing valve in the wet gas supply line, the control unit being operatively connected to the variable pressure reducing valve for regulating the same to maintain a substantially constant flow of gas in the reactivating gas line the reactivating gas supply line leading from the wet gas supply line upstream of the pressure reducing valve, and the line for conducting reactivating gas from the towers being connected through the heat exchanger into the wet gas supply line downstream of said pressure reducing valve.

8. The system for removing condensible fluids from gaseous streams which includes, a pair of towers containing sorbent material, a line for supplying a wet gas to the towers, valves in the line for controlling the supply of wet gas to the towers, a line for discharging treated gas from the towers, valves in the second line for controlling the discharge of treated gas from the towers, a heat exchanger through which the gaseous stream flows, a line for supplying a reactivating gas to the towers, valves in the latter line for controlling the supply of reactivating gas to the towers, a line for conducting the reactivating gas from the towers, downwardly directed elbows within the towers connected to the latter line, valves in the latter line for controlling the conducting of the reactivating gas from the towers, means for automatically actuating the valves alternately in each line to alternately supply wet gas and reactivating gas to each tower and to automatically cut off alternately the escape of treated gas and reactivating gas, rate of flow measuring means in one of the reactivating gas lines, a control unit connected to the measuring means and operated thereby, and a variable pressure reducing valve in the wet gas supply line, the control unit being operatively connected to the variable pressure reducing valve for regulating the same to maintain a substantially constant flow of gas in the reactivating gas line the reactivating gas supply line leading from the wet gas supply line upstream of the pressure reducing valve, and the line for conducting reactivating gas from the towers being connected through the heat exchanger into the wet gas supply line downstream of said pressure reducing valve.

9. The system of removing condensible fluids from gaseous streams which includes, a pair of vessels containing sorbent material, means for conducting the gaseous stream alternately to each of the vessels, means for carrying off the treated gaseous stream from the vessels, variable means for reducing the pressure of the gaseous stream prior to its introduction into the vessels, a conductor communicating with the gaseous stream prior to its pressure reduction for conducting a minor portion of said stream separately thereof, a heater through which the minor portion of the stream passes, a conductor leading from the heater and communicating with each of the vessels for alternately conveying the heated portion of the gaseous stream to said vessels, control means in the latter conductor for actuating the variable pressure reduction means, in accordance with the rate of flow of the minor portion of the gaseous stream in said latter conductor, a second conductor for carrying off the minor portion of the gaseous stream from the vessel, a heat exchanger connected into the gaseous stream, said second conductor communicating with the heat exchanger for cooling the minor portion of the gaseous stream subsequent to its passage through the vessel, means for removing condensed fluids from the minor portion of the gaseous stream subsequent to its cooling, a conductor leading from the latter means and communicating with the gaseous stream downstream of the pressure reduction means, and means for alternately switching the flow of the gaseous stream and the minor portion thereof between said vessels.

10. The system for removing condensible fluids from gaseous streams which includes, a pair of towers containing sorbent material, a line for supplying a wet gas to the towers, valves in the line for controlling the supply of wet gas to the towers, a line for discharging treated gas from the towers, valves in the second line for controlling the discharge of treated gas from the towers, a line for supplying a reactivating gas to the towers, valves in the latter line for controlling the supply of reactivating gas to the towers, a line for discharging the reactivating gas from the towers, valves in the latter line for controlling the discharging of the reactivating gas from the towers, means for automatically actuating the valves alternately in each line to alternately supply reactivating gas and wet gas to each tower and to automatically cut-off alternately the escape of treated gas and reactivating gas, rate of flow measuring means in the reactivating gas supply line, a control unit connected to the measuring means and operated thereby, a variable pressure reducing valve in the wet gas supply line, the control unit being operatively connected to the variable pressure reducing valve for regulating the same to maintain a substantially constant flow of gas in the reactivating gas line, the reactivating gas supply line leading from the wet gas supply line upstream of the pressure reducing valve, and the line for discharging reactivating gas from the towers being connected into the wet gas supply line downstream of said reducing valve, a heater in the reactivating gas supply line, and a heat exchanger through which the gaseous stream and the discharged reactivating gas pass.

JAY P. WALKER.
CLARENCE O. GLASGOW.

References Cited in the file of this patent

UNITED STATES PATENTS

| Number | Name | Date |
|---|---|---|
| 1,948,779 | Abbott et al. | Feb. 27, 1934 |
| 2,248,225 | Fonda | July 8, 1941 |
| 2,248,956 | Carvlin et al. | July 15, 1941 |
| 2,349,944 | Dixon | May 30, 1944 |
| 2,359,660 | Martin et al. | Oct. 3, 1944 |
| 2,535,902 | Dailey, Jr. | Dec. 26, 1950 |
| 2,629,460 | Maki | Feb. 24, 1953 |